United States Patent
Kokotov et al.

(10) Patent No.: US 9,190,221 B2
(45) Date of Patent: Nov. 17, 2015

(54) AQUEOUS-BASED ELECTRIC DOUBLE-LAYER CAPACITOR

(71) Applicant: ELBIT SYSTEMS LAND AND C4I LTD., Netanya (IL)

(72) Inventors: Michael Kokotov, Rehovot (IL); Michael Lerner, Rishon Lezion (IL); Ervin Tal-Gutelmacher, Hod HaSharon (IL); Erez Schreiber, Rishon LeZion (IL)

(*) Notice: Subject to any disclaimer, the term of this patent is extended or adjusted under 35 U.S.C. 154(b) by 0 days.

(21) Appl. No.: 14/386,114

(22) PCT Filed: Mar. 13, 2013

(86) PCT No.: PCT/IL2013/050233
§ 371 (c)(1),
(2) Date: Sep. 18, 2014

(87) PCT Pub. No.: WO2013/140392
PCT Pub. Date: Sep. 26, 2013

(65) Prior Publication Data
US 2015/0049416 A1 Feb. 19, 2015

(30) Foreign Application Priority Data

Mar. 18, 2012 (IL) .......................... 218691

(51) Int. Cl.
*H01G 9/00* (2006.01)
*H01G 11/14* (2013.01)
(Continued)

(52) U.S. Cl.
CPC .............. *H01G 11/14* (2013.01); *H01G 11/04* (2013.01); *H01G 11/12* (2013.01); *H01G 11/28* (2013.01);
(Continued)

(58) Field of Classification Search
CPC ....... H01G 11/12; H01G 11/14; H01G 11/28; H01G 11/66; H01G 9/00; H01G 9/02
USPC .......... 361/509–512, 516–518, 523, 525–529
See application file for complete search history.

(56) References Cited

U.S. PATENT DOCUMENTS 6,174,337 B1    1/2001 Keenan
6,449,139 B1 *  9/2002 Farahmandi et al. ......... 361/502
(Continued)

OTHER PUBLICATIONS

Notification Concerning Transmittal of International Preliminary Report on Patentability for International Application No. PCT/IL2013/050233; date mailed Oct. 2, 2014; 7 pages.
(Continued)

*Primary Examiner* — Nguyen T Ha
(74) *Attorney, Agent, or Firm* — Gearhart Law LLC

(57) ABSTRACT

An electric double-layer capacitor (EDLC) and method for manufacturing thereof. The ELDC includes at least one capacitor cell with two parallel current collectors, two opposite polarity electrodes, a separator, a rigid dielectric frame, and at least one evacuation mechanism. Each electrode is disposed on a respective current collector, and impregnated with aqueous electrolyte. The frame is disposed along the perimeter on the surface of a current collector and enclosing the electrodes. The evacuation mechanism removes superfluous fluid material from the capacitor cell interior. The evacuation mechanism may be a compartment in the frame, operative to collect residual electrolyte that seeps out from the electrodes, or a capillary formed within the frame and extending into a portion of the electrode, the capillary composed of a porous hydrophobic material and operative to evacuate discharged gases from the electrodes out of the EDLC.

20 Claims, 8 Drawing Sheets

(51) Int. Cl.
*H01G 11/04* (2013.01)
*H01G 11/12* (2013.01)
*H01G 11/28* (2013.01)
*H01G 11/32* (2013.01)
*H01G 11/52* (2013.01)
*H01G 11/58* (2013.01)
*H01G 11/66* (2013.01)
*H01G 11/86* (2013.01)

(52) U.S. Cl.
CPC ............... *H01G 11/32* (2013.01); *H01G 11/52* (2013.01); *H01G 11/58* (2013.01); *H01G 11/66* (2013.01); *H01G 11/86* (2013.01); *Y02E 60/13* (2013.01); *Y02T 10/7022* (2013.01)

(56) References Cited

U.S. PATENT DOCUMENTS

| | | | |
|---|---|---|---|
| 6,791,820 B1 * | 9/2004 | Varakin et al. | 361/502 |
| 6,827,879 B2 | 12/2004 | Shinozaki et al. | |
| 8,027,147 B2 * | 9/2011 | Miller et al. | 361/502 |
| 8,090,482 B2 * | 1/2012 | Jolly et al. | 701/3 |
| 8,451,582 B2 * | 5/2013 | Sneh et al. | 361/311 |
| 8,675,346 B2 * | 3/2014 | Dunn et al. | 361/502 |
| 2006/0238957 A1 | 10/2006 | Mitsuda et al. | |
| 2010/0053846 A1 | 3/2010 | Horikoshi | |
| 2011/0027630 A1 | 2/2011 | Tsutsumi et al. | |
| 2012/0050946 A1 | 3/2012 | Ra et al. | |

OTHER PUBLICATIONS

Notification of Transmittal of the International Search Report and the Written Opinion for International Application No. PCT/IL2013/050233 date mailed Jul. 1, 2013; 13 pages.

* cited by examiner

AQUEOUS-BASED ELECTRIC DOUBLE-LAYER CAPACITOR

CROSS REFERENCE TO RELATED APPLICATIONS

This application is a national stage entry of PCT/IL2013/050233 filed on Mar. 13, 2013, which in turn claims the benefit of priority from Israel Patent Publication No. 218691 filed on Mar. 18, 2012. Each of the foregoing patent applications is incorporated by reference herein in its entirety for any purpose whatsoever.

FIELD OF THE DISCLOSED TECHNIQUE

The disclosed technique generally relates to capacitors, and more particularly, to electric double-layer capacitors.

BACKGROUND OF THE DISCLOSED TECHNIQUE

An electric double-layer capacitor (EDLC), also known as a "supercapacitor" or "ultracapacitor", is a type of electrochemical capacitor, which is characterized by a very high energy density relative to conventional capacitors. Instead of two metal plates separated by a regular dielectric material, an EDLC involves the separation of charges in a double electric field formed at the interface between an electrolyte and a high surface area conductor. A basic EDLC cell configuration is a pair of highly porous electrodes, typically including activated carbon, disposed on opposite faces of parallel conductive plates known as current collectors. The electrodes are impregnated with an electrolyte, and separated by a separator consisting of a porous electrically-insulating and ion-permeable membrane. When a voltage is applied between the electrodes, negative ions from the electrolyte flow to the positive electrode while positive ions from the electrolyte flow to the negative electrode, such that an electric double layer is formed at each electrode/electrolyte interface by the accumulated ionic charges. As a result, energy is stored by the separation of positive and negative charges at each interface. The separator prevents electrical contact between the conductive electrodes but allows the exchange of ions. When the EDLC is discharged, such as by powering an external electrical device, the voltage across the electrodes results in current flow as the ions discharge from the electrode surfaces. The EDLC may be recharged and discharged again over multiple charge cycles.

The extremely high surface area of the activated carbon electrodes, combined with a separation distance between electric double layers on the order of nanometers (compared with millimeters for electrostatic capacitors and micrometers for electrolytic capacitors), enables the absorption of a large number of ions per unit mass and, thus, an energy density that is orders of magnitude greater than that of conventional capacitors. The electrolyte may be an aqueous-based solution (e.g., a water solution of potassium hydroxide (KOH) or sulfuric acid ($H_2SO_4$)) or organic-based (e.g., acetonitrile ($CH_3CN$), polypropylene carbonate). In an aqueous-based electrolyte, the voltage is limited to approximately 1V (above which water decomposes), whereas organic-based electrolytes have a higher maximum voltage of about 2.5-3.0V. Since each individual EDLC cell is limited to a relatively low voltage, multiple EDLC cells may be connected in series to enable higher voltage operation. However, serial connection reduces the total capacitance and also requires voltage-balancing.

While the amount of energy stored per unit weight is generally lower in an EDLC in comparison to electrochemical batteries, the EDLC has a much greater power density and a high charge/discharge rate. Furthermore, an EDLC has a far longer lifespan than a battery and can undergo many more charge cycles with little degradation (millions of charge cycles, compared to hundreds for common rechargeable batteries). Consequently, EDLCs are ideal for applications that require frequent and rapid power delivery, such as hybrid vehicles that are constantly braking and accelerating, while batteries are used to supply a larger amount of energy over a longer period of time. EDLCs are also environmentally friendly (have a long lifespan and are recyclable), safe (no corrosive electrolytes and other toxic materials requiring safe disposal), lightweight, and have a very low internal resistance (ESR). The charging process of an EDLC is also relative simple, as it draws only is the required amount and is not subject to overcharging. An EDLC has a higher self-discharge compared to other capacitors and electrochemical batteries.

During EDLC operation at high operating temperatures and/or high operating voltages, various potentially detrimental parasitic effects tend to occur. In particular, electrochemical reactions cause excessive pressures in the electrode composition, resulting in the discharge of gases. The built up pressures from the discharged gases could result in swelling or bursting of the capacitor elements.

Advances in materials and manufacturing methods in recent years have led to improved performance and lower cost of EDLCs, and to their utilization in various applications. For example, EDLCs can be employed to operate low-power electrical equipment, and to provide peak-load enhancement for hybrid or fuel-cell vehicles. EDLCs are also commonly used to complement batteries, such as in order to bridge short power interruptions in an uninterruptible power supply.

U.S. Pat. No. 4,697,224 to Watanabe et al, entitled "Electric double layer capacitor", is directed to an EDLC which includes an electrically insulative and ion-permeable separator, and a pair of polarizable electrodes of solid carbonaceous material which are disposed opposite each other on opposite sides of the separator. The separator and electrodes are sealed within a gasket of insulating rubber. The separator and at least one of the electrodes are adhered to each other by an adhesive or cohesive agent in part of a region in which the electrode faces the separator, in order to prevent possible displacement of the electrodes and shorting via mutual contact.

European Patent No. 786,786 to Varakin, entitled "Capacitor with a double electrical layer", discloses an EDLC with one electrode made of nickel oxide and the other electrode made of a fibrous carbonic material, preferably nickel-plated or copper-plated. The electrolyte is an aqueous solution of an alkali metal carbonate or hydroxide.

U.S. Pat. No. 6,201,685 to Jerabek et al, entitled "Ultracapacitor current collector", discloses a nonaqueous ultracapacitor with current collectors comprising a conductive metal substrate, such as aluminum, which is coated with a nitride, carbide or boride of a refractory metal. The coating is intended to prevent the formation and thickening of a highly resistive aluminum oxide layer on the current collector.

U.S. Pat. No. 6,594,138 to Belyakov et al, entitled "Electrochemical capacitor and method for making the same", is directed to an electrochemical capacitor with a bank of elements made up of series-connected internal elements and end elements. Each internal element includes an electron-conducting collector, porous different-polarity electrodes disposed on opposite sides of the collector, and electron-insulating separators mounted on the electrodes. Each end element includes a collector and an electrode of an appropriate polarity disposed on one of its sides. The electrodes and separators are impregnated with an electrolyte. The solid phase-to-liquid ratios of the electrodes are selected to lower the probability of electrolyte leakage during assembly and to minimize internal resistance of the capacitor. The capacitor body includes interconnected hold-downs with electron conductors for levelling-out the voltage in the series-connected elements. A polymeric coating is applied onto the conductors, to prevent short-circuiting of nearby elements to the electrolyte. The bank is also coated with a polymeric composition for sealing the elements, where the coating includes an additional layer that eliminates the effect of the neutralizing component on the rate of polymeric hardening. The bank is evacuated at a residual pressure of 9.8-19.6 kPa prior to mounting between the hold-downs, enabling removal of excess air dissolved in the electrolyte during colloidal milling of the electrode mass.

U.S. Pat. No. 6,773,468 to Lang, entitled "Method of making electrochemical capacitor using a printable composition", is directed to a preparation method for an electrochemical capacitor cell that includes: a pair of current collector plates placed in parallel; flat electrodes containing aqueous electrolyte printed on opposing faces of the current collectors; and a separator interposed between the electrodes. The electrodes are printed such that a peripheral region not covered by the electrode is defined on each of the faces of the current collectors. The geometric form and size of the separator is identical to the form and size of the current collector plates. The separator includes a central region permeable to the electrolyte surrounded by a peripheral masked region non-permeable to the electrolyte, where the permeable region coincides with the electrodes. A sealant is impregnated in the pores in the peripheral region of the separator. At least one layer of adhesive is deposited on the sealant. The electrodes are fabricated using a suitable printable composition.

SUMMARY OF THE DISCLOSED TECHNIQUE

In accordance with one aspect of the disclosed technique, there is thus provided an electric double-layer capacitor (EDLC) that includes at least one capacitor cell, where the capacitor cell includes two current collectors, two electrodes of opposite polarity, a separator, a rigid dielectric frame, and at least one evacuation mechanism within the frame. The current collectors are aligned with their faces in parallel. The current collectors are made from a conductive material. Each of the electrodes is disposed on a respective one of the current collectors. The electrodes include activated carbon impregnated with an aqueous electrolyte. The separator is disposed between the electrodes. The separator includes an inert, electrically-insulating and ion-permeable material. The frame is disposed along the perimeter on the surface of at least one of the current collectors and enclosing the electrodes. The evacuation mechanism is operative to remove superfluous fluid material from the interior of the capacitor cell. The evacuation mechanism may be at least one compartment disposed in the frame, the compartment operative to collect residual electrolyte that seeps out from the electrodes. The evacuation mechanism may be at least one capillary respective of each electrode of the capacitor cell, the capillary formed within the frame and extending into a portion of the electrode. The capillary is composed of a porous hydrophobic material and is operative to evacuate discharged gases from the electrodes out of the EDLC. The EDLC may be an EDLC stack made up of a plurality of such capacitor cells connected in series. The frame may further include at least one notch formed at the inner perimeter of the frame and extending up to at least one compartment. The distal ends of the capillaries of an EDLC may be coupled with a channel that extends out of the EDLC. The channel may include at least one mechanism operative to prevent the passage of oxygen into the EDLC. The mechanism may be a unidirectional valve disposed in the channel, the valve operative to enable the discharged gases to exit the EDLC while preventing gas entry into the EDLC. The mechanism may include a tube having a length and thickness that limits the passage of oxygen into the EDLC. The EDLC stack may include two metal plates, between which the capacitor cells are fixed and pressed together. The EDLC stack may be coated with a polymeric sealant to seal in the capacitor cells. The EDLC stack may include at least one fastening mechanism for holding together the plates. The fastening mechanism may include hold-down screws, disposed through the plates at the perimeter of the plates. The fastening mechanism may include straps, enclosed around both plates. The EDLC stack may include at least one support rod, disposed against the outer surface of at least one plate and bounded by the straps. The rod is operative to straighten the plates and to disperse pressure evenly along the surface of the electrodes between the plates. The EDLC stack may include at least one graphite film, disposed between one of the plates and the adjacent capacitor cell. The graphite film is operative to prevent electrolytic leakage while maintaining electrical conductivity.

In accordance with another aspect of the disclosed technique, there is thus provided a method for manufacturing an EDLC that includes at least one capacitor cell. The method includes the procedures of: preparing two electrodes of opposite polarity, the electrodes including activated carbon impregnated with an aqueous electrolyte; disposing each of the electrodes onto a respective one of two current collectors aligned in parallel, the current collectors made from a conductive material; disposing a separator between the electrodes, the separator including an inert, electrically-insulating and ion-permeable membrane; disposing a rigid dielectric frame along the perimeter on the surface of at least one of the current collectors, the frame enclosing the electrodes; and providing at least one evacuation mechanism within the frame, the evacuation mechanism operative to remove superfluous fluid material from the interior of the capacitor cell. The procedure of providing at least one evacuation mechanism may include forming at least one compartment within the frame, the compartment operative to collect residual electrolyte that seeps out from the electrodes. The procedure of providing at least one evacuation mechanism may include forming at least one capillary, respective of each electrode of the capacitor cell, within the frame and extending into a portion of the electrode, where the capillary is composed of a porous hydrophobic material and is operative to evacuate discharged gases from the electrodes out of the EDLC. The procedure of preparing two electrodes includes the procedures of: thermally treating an electrode mixture that includes activated carbon; impregnating the electrode mixture with an electrolyte solution while subjecting the mixture to a colloidal mill; terminating the colloidal mill, producing an electrode/electrolyte paste; and rolling the paste into a sheet with a selected thickness, and cutting the sheet into multiple electrode sections with selected dimensions. The method may further include the procedure of connecting a plurality of the capacitor cells in series, to prepare an EDLC stack. The method may further include the procedure of forming at least one notch at the inner perimeter of the frame and extending up to at least one of the compartments. The method may further include the procedure of casting at least one channel that extends out of the EDLC, where the distal ends the capillaries are coupled with at least one channel. The method may further include the procedure of providing at least one mechanism in the channel to prevent the passage of oxygen into the EDLC. The method may further include the procedure of fixing and pressing together the capacitor cells between two metal plates, where the plates are held together with at least one fastening mechanism.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a novel design and arrangement for an electric double-layer capacitor (EDLC) and a method for preparation thereof. The EDLC is preferably embodied by a stack of multiple capacitor cells, where each cell includes opposite-polarity electrodes disposed on respective current collector films, an aqueous electrolyte impregnated on the electrodes, a separator, and a rigid dielectric frame along the perimeter of the current collector films enclosing the electrodes. The frame include at least one evacuation mechanism for removing superfluous fluid material from the interior of the capacitor cell. The evacuation mechanism may be compartments disposed within the frame that provide safe storage of residual electrolyte that seep out from the electrodes, particularly during the fabrication process, preventing leakage currents and electrolytic bridging between capacitor elements. The evacuation mechanism may be capillaries formed within the frame and extending into the electrode, the capillaries evacuating discharged gases away from the electrodes and out of the EDLC, preventing swelling or bursting of the capacitor particularly at high operating temperatures or high operating voltages. The EDLC further includes at least one mechanism for preventing oxygen entry, such as a unidirectional valve disposed in a channel that extends through the EDLC stack.

Figure 1A:
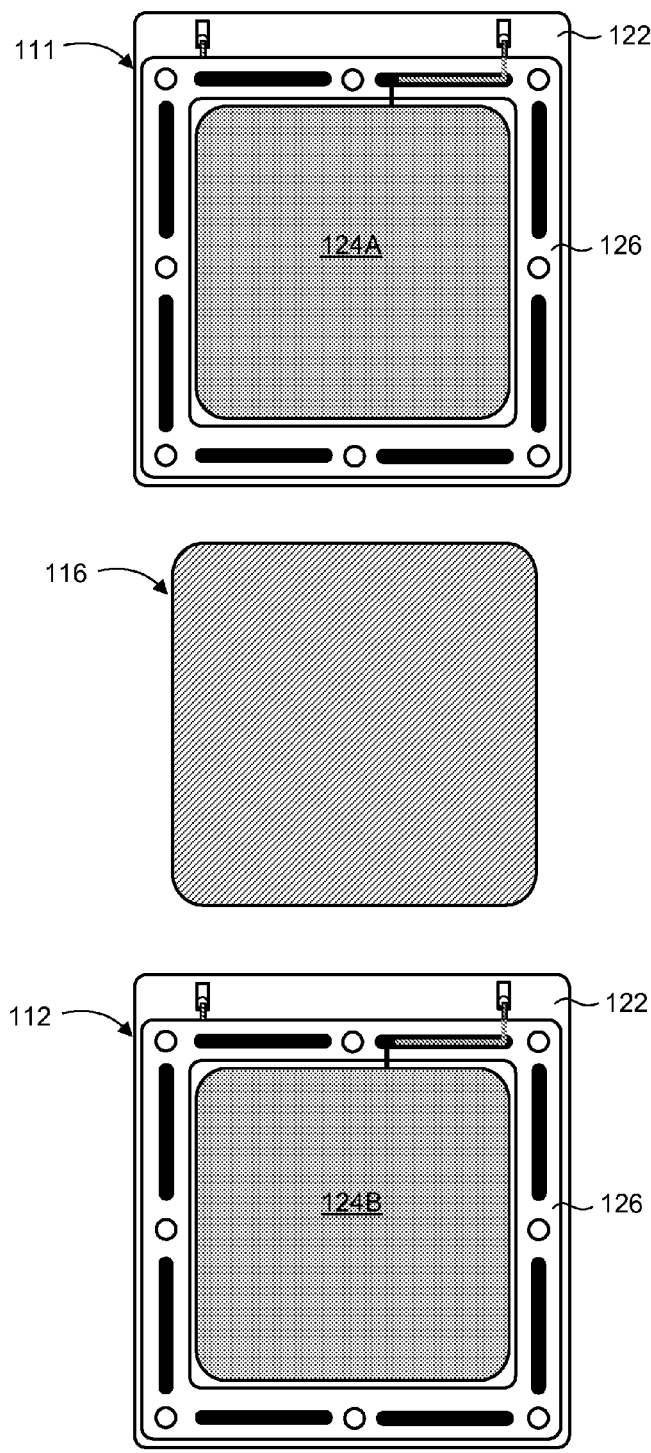
FIG. 1A is a sectional view schematic illustration of the components of a single EDLC cell, constructed and operative in accordance with an embodiment of the disclosed technique.
Figure 1B:
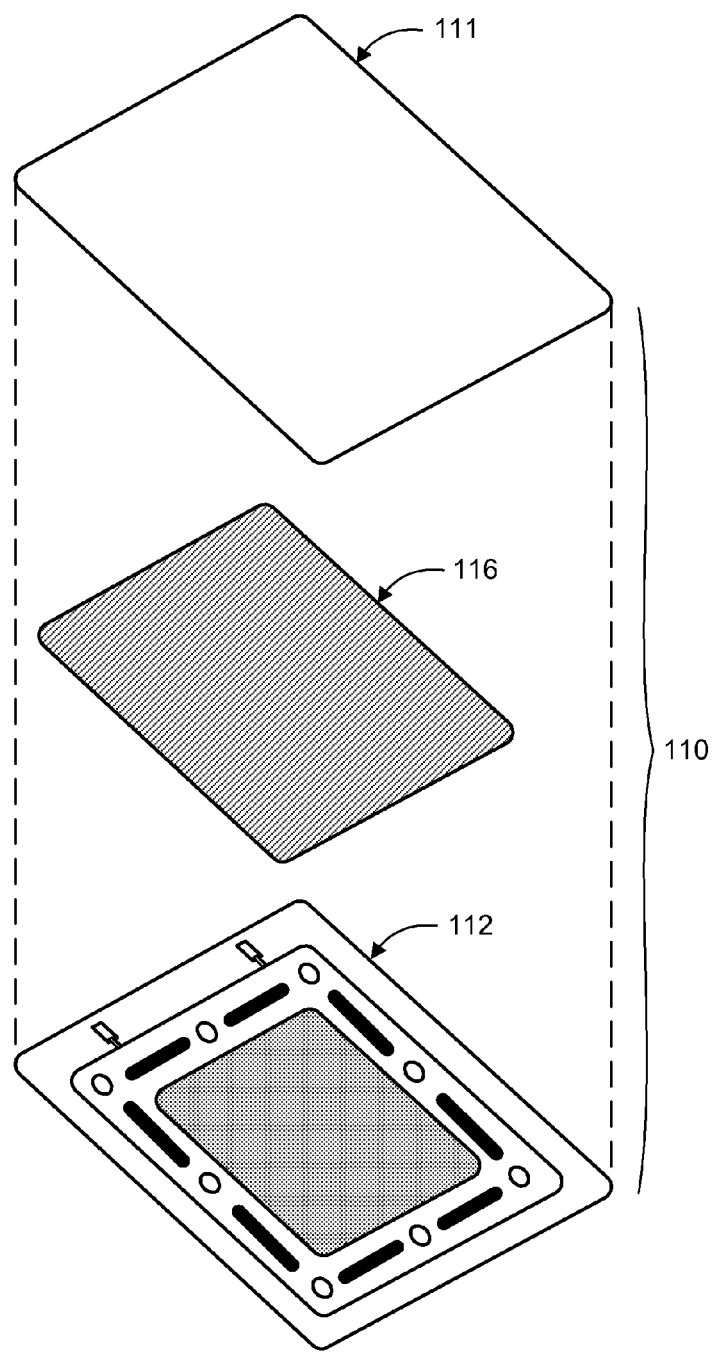
FIG. 1B is an isometric view schematic illustration of the components of FIG. 1A relatively positioned while forming the EDLC cell.
Figure 1C:
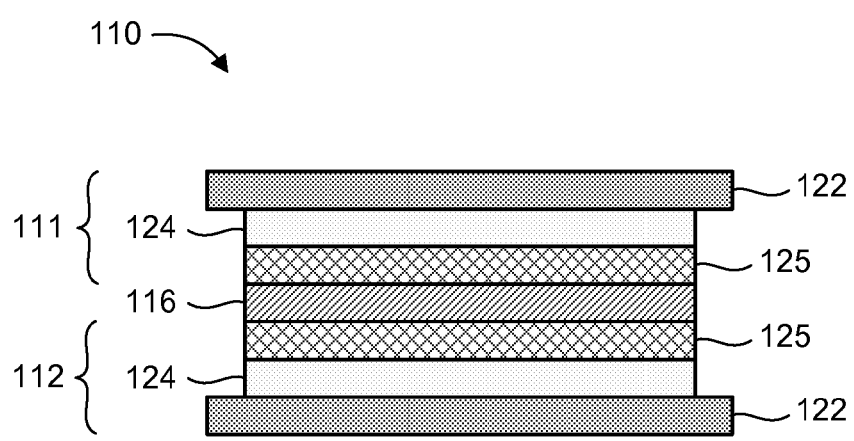
FIG. 1C is a side view schematic illustration of the formed EDLC cell of FIGS. 1A and 1B.

Reference is now made to FIGS. 1A, 1B and 1C. FIG. 1A is a sectional view schematic illustration of the components of a single EDLC cell, generally referenced 110, constructed and operative in accordance with an embodiment of the disclosed technique. FIG. 1B is an isometric view schematic illustration of the components of FIG. 1A relatively positioned while forming EDLC cell 110. FIG. 10 is a side view schematic illustration of the formed EDLC cell 110 of FIGS. 1A and 1B. An exemplary EDLC cell 110 of the disclosed technique is made up of a pair of films 111 and 112, and a separator 116. Each film 111, 112 is composed of a current collector 122 on which there is an electrode 124 impregnated with an electrolyte 125. A rigid dielectric frame 126 is positioned over the current collector 122 bordering the electrode 124, as will be elaborated upon hereinbelow. Separator 116 is disposed in between films 111 and 112.

Current collector 122 is made from a conductive material, such as a conductive polymer material, in which the electrical conductivity is anisotropic, such that the conductivity perpendicular to the surface of the current collector sheet is greater than the conductivity along the surface. Alternatively, current collector 122 is made from a metal or other material which is inert to electrolyte 125. Electrode 124 is composed of a mixture of activated carbon and various additives and nanoparticles (e.g., metal oxides, carbon nanotubes, metal nanoparticles, and the like). The activated carbon is prepared from raw materials such as charcoal, carbon, and coke. Electrolyte 125 is an aqueous-based solution that includes an alkaline and/or acid and salts, such as a water solution of potassium hydroxide (KOH) or sulfuric acid ($H_2SO_4$). Separator 116 is an inert membrane, which is ion-permeable (i.e., allowing the exchange of ions therethrough) and electrically-insulating (i.e., preventing the transfer of electrons therethrough). Separator 116 may optionally include multiple layers (e.g., a number of separate ion-permeable and electrically-insulating membranes arranged successively).

The preparation process for the electrodes involves thermal treatment of the activated carbon, followed by simultaneously impregnating the electrode material with the electrolyte solution while subjecting the electrode-electrolyte mixture to a colloidal mill. The colloidal mill process is completed, resulting in a viscous paste substance. Optionally, one or both surfaces of separator 116 is also impregnated with the electrolyte solution 125. The electrode/electrolyte paste is rolled into a sheet with a suitable thickness (e.g., approximately 700 μm), and the sheet is precisely cut into multiple electrode sections with selected dimensions. An individual electrode section is then disposed onto a current collector film. Each EDLC cell 110 includes at least two electrodes 124A, 124B with opposite polarity, and a separator 116 in between. The application of a voltage between electrodes 124A, 124B results in electrolytic ionic transfer and the formation of an electric double-layer at each electrode and electrolyte interface.

Figure 2A:
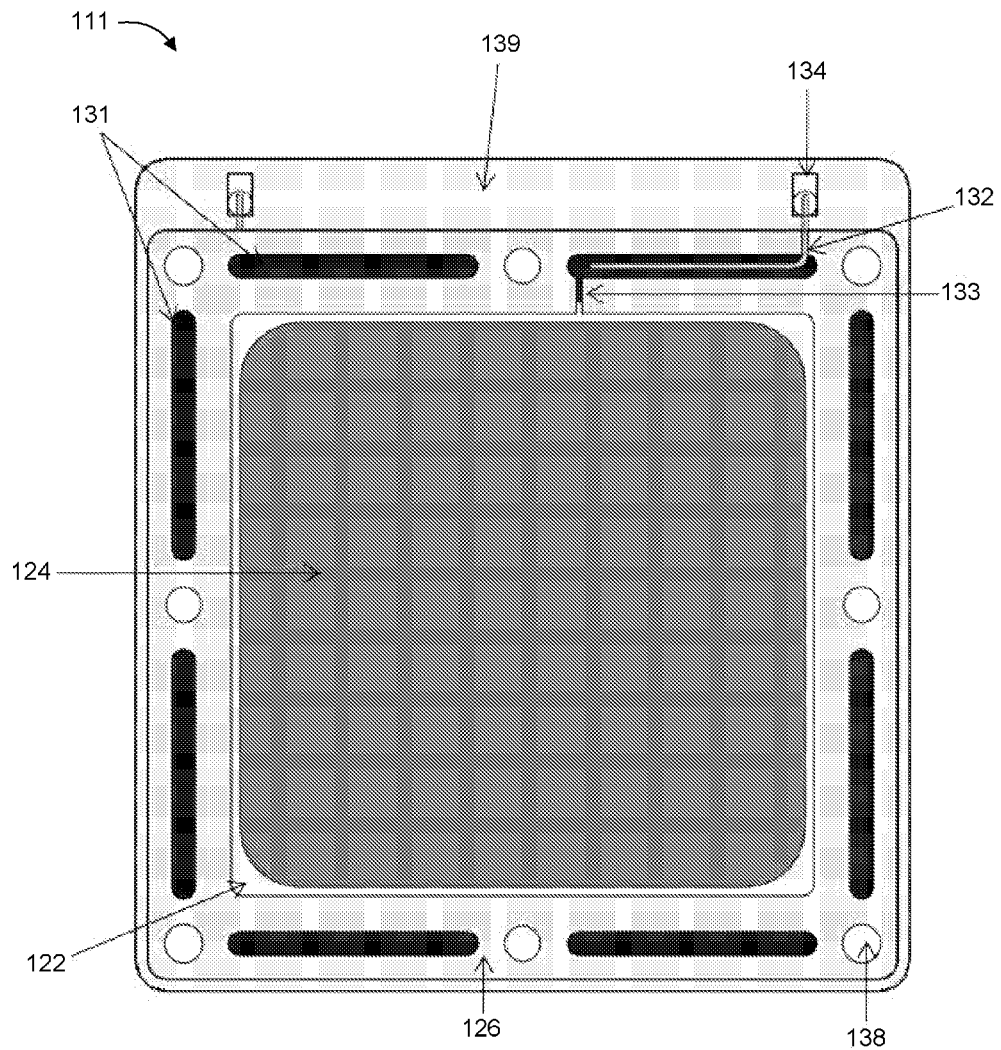
FIG. 2A is a detailed sectional view schematic illustration of an individual film of an EDLC cell, constructed and operative in accordance with an embodiment of the disclosed technique.
Figure 2B:
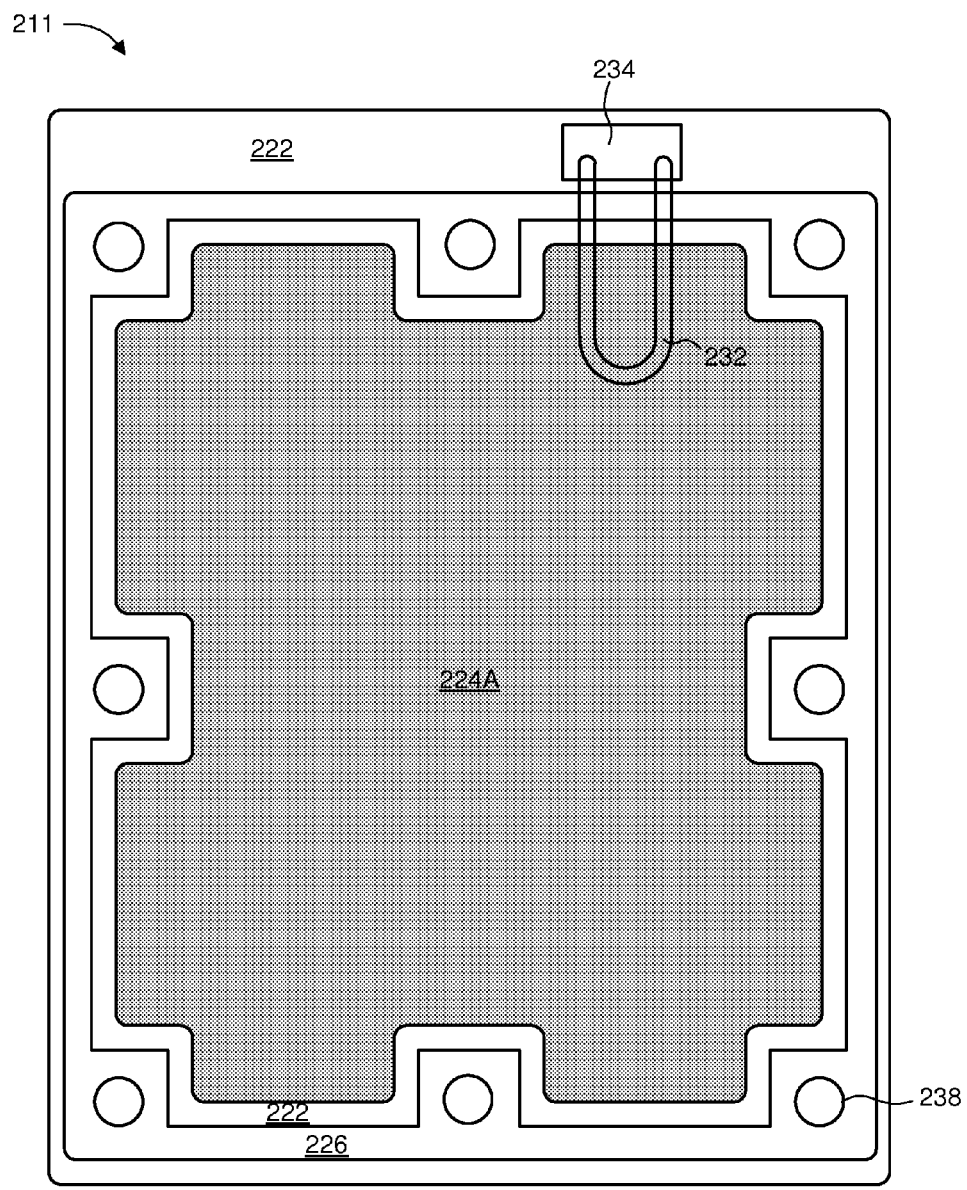
FIG. 2B is a detailed sectional view schematic illustration of an individual film of an EDLC cell, constructed and operative in accordance with another embodiment of the disclosed technique.
Figure 3:
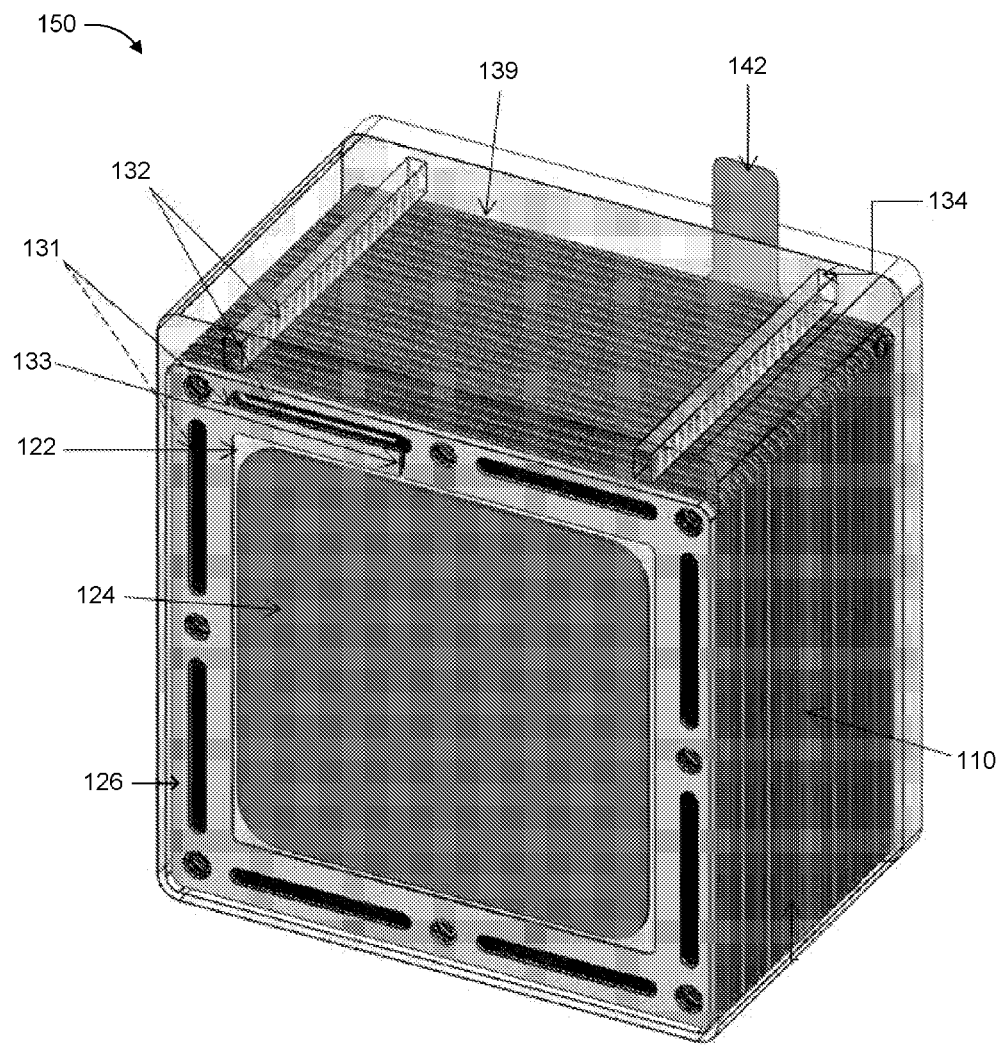
FIG. 3 is an isometric sectional view schematic illustration of an EDLC stack composed of a plurality of EDLC cells, constructed and operative in accordance with an embodiment of the disclosed technique.

Multiple cells are arranged on top of one another and connected in series to form a stack, providing an EDLC which is able to withstand a higher voltage (compared to that of an individual EDLC cell). Reference is now made to FIGS. 2A, 2B and 3. FIG. 2A is a detailed sectional view schematic illustration of an individual film 111 of the EDLC cell 110, constructed and operative in accordance with an embodiment of the disclosed technique. FIG. 2B is a detailed sectional view schematic illustration of an individual film, referenced 211, of an EDLC cell 110, constructed and operative in accordance with another embodiment of the disclosed technique. FIG. 3 is an isometric sectional view schematic illustration of an EDLC stack, generally referenced 150, composed of a plurality of EDLC cells 110, constructed and operative in accordance with an embodiment of the disclosed technique. Film 111 includes a current collector 122, an electrode 124, and a frame 126. Referring to FIG. 2A, frame 126 includes a plurality of compartments 131, at least one capillary 132, and at least one notch 133. Hollow channel 134 is situated through EDLC stack 150 extending across all of the cells 110 (i.e., into the cross-sectional plane defined by each EDLC cell) and terminating in a one-way valve 148 (depicted in FIGS. 4 and 5). Stack 150 includes a first external terminal lead-out 142 and a second external terminal lead-out 144 (depicted in FIGS. 4 and 5). All the cells of a stack are fixed between two metal plates 146 and pressed together at a sufficient pressure (e.g., 10 kgF/cm$^2$) in accordance with the size and dimensions of the EDLC cells 110. The two plates 146 are held together via at least one fastening mechanism, such as hold-down screws 138 (FIG. 4) or rods 152 and straps 154 (FIG. 5). Plates 146 are made from a metal that is inert to electrolyte 125. Stack 150 is coated with a polymeric sealant 139 to seal in all of the cells 110. During the sealing process, two hollow channels 134 are casted, such that the capillaries 132 protruding from each cell are assembled within the interior of the channels 134, ensuring that the capillaries are not filled with the sealant 139. Stack 150 may alternatively include a single channel 134 or more than two channels 134. Channels 134 may be embodied by a discrete tube which passes through the casted region within stack 150 and exits out of stack 150. The negative electrodes 124A of all EDLC cells 110 are electrically coupled with first terminal lead-out 142, and the positive electrodes 124B of all EDLC cells 110 are electrically coupled with second terminal lead-out 144. The external ends of first terminal lead-out 142 and second terminal lead-out 144 are electrically connected to respective terminals of an external power source.

Frame 126 is a rigid border which is disposed over current collector 122 on the edge of film 111 at the periphery of electrode 124. Frame 126 is made of a dielectric material that is inert to the aqueous electrolyte 125. Possible materials for frame 126 include: polyvinyl chloride (PVC), polypropylene (PP), polytetrafluoroethylene (PTFE) aka Teflon, EPDM rubber, and other polymers. Both surfaces of film 111 (i.e., both the front and rear) includes a respective frame 126. Frame 126 is adhered onto current collector 122 using a suitable adhesive material and/or adhesion technique (e.g., glue, heating, laser, soldering, and the like). Separator 116 is, in turn, adhered onto frame 126 via an adhesive or sealant (while the opposite surface of separator is adhered onto the respective frame of the adjacent current collector/electrode film 112). To facilitate the fabrication process, individual layers of the films may be prepared separately and then adhered to one another (e.g., one frame 126 is adhered to a first surface of a first film 111, another frame 126 is adhered to a first surface of a second film 112, and then the second surface of film 111 is adhered to the first surface of film 112). Preferably, there is an electrode 124 on each surface (i.e., one on the front and one on the rear) of every film of EDLC stack 150 except for the very first (i.e., uppermost) film and the very last (i.e., lowermost) film.

Frame 126 serves to delimit the electrode region of the film, to facilitate the pressing together of multiple films when preparing the stack, and to further constrict the layers in the stack to minimize the internal resistance of the capacitor. Additionally, frame 126 is operative to isolate between the adjacent films 111, 112 and to prevent the aqueous electrolyte 125 from leaking through the edges of the films, particularly while compressing films in the stack, thereby preventing charge transfer between electrodes 122A and 122B which would result in a short circuit (i.e., "electrolytic bridging"). It is appreciated that the frame 126 of the disclosed technique may be utilized in conjunction with electrodes with variable thicknesses, which makes it possible to ensure reproducibility and stable electrical performance characteristics at a variety of charging currents.

Compartments 131 (FIG. 2A) are interspersed throughout frame 126. Preferably, a compartment 131 projects slightly inwards with respect to the flat surface of frame 126 to form an indentation or groove within frame 126. It is noted that a compartment 131 may extend all the way to the edge of frame 126, or may be fully situated within the frame margins. Notch 133 is formed at the inner perimeter of frame 126 and extends up to a compartment 131, such that notch 133 is connected to a compartment 131 at one end and to a current collector region 122 at the edge of electrode 124 at the other end. At least one compartment 131 in frame 126 is connected to at least one notch 133, i.e., frame 126 may include some compartments 131 that are not connected to a notch 133 (note that only a single notch 133 is depicted in FIG. 2A for illustrative purposes only). Capillary 132 is disposed within a compartment 131 and protrudes out of frame 126 and into channel 134. Each electrode 124 in EDLC stack 150 is associated with at least one capillary 132 (i.e., each EDLC cell 110 is associated with at least a pair of capillaries 132). All the capillaries 132 from individual cells 110 in the stack 150 are assembled within channel 134.

Compartments 131 serve as storage regions for residual electrolyte 125 that seeps out from electrodes 124 due to externally applied pressure, such as when films 111, 112 are pressed together during the fabrication process of EDLC cell 110. This residual electrolyte 125 is collected within compartments 131, preventing leakage currents that would result if the electrolyte 125 exits frame 126 (e.g., if stack 150 has poor sealing), and preventing electrolytic bridging between electrodes 124A, 124B (as frame 126 maintains isolation of the electrolyte 125 from the electrodes 124). In addition, the residual electrolyte 125 being collected within compartments 131 also serves to limit electrolytic dehydration of EDLC stack 150. It is appreciated that compartments 131 are optional, and a frame of the disclosed technique may alternatively include no compartments, as depicted in FIG. 2B (discussed further herein below).

Capillaries 132 provide an evacuation mechanism for the excess gases released by electrodes 124 due to various parasitic effects during EDLC operation, particularly at high operating temperatures and/or high operating voltages. These gases are evacuated via capillaries 132 and notches 133, allowing for the built-up pressures in EDLC cells 110 to be released, and avoiding swelling or even bursting of the capacitor in such conductions. Capillaries 132 are made from a porous hydrophobic material, such as PTFE (Teflon) or another suitable hydrophobic polymer, such that gases are capable of passing through the capillary walls but liquids cannot. Thus, capillaries 132 allow for the removal of the released gases while keeping inside the aqueous electrolyte 125, thereby minimizing electrolytic dehydration. Accordingly, the gases produced by the aforementioned parasitic effects exit electrode region 124 of EDLC cell 110 through notches 133 and the walls of capillaries 132, from where the gases are transported through channel 134 out of EDLC stack 150 via external unidirectional valve 148. It is appreciated that the relatively small thickness of the capillary walls (e.g., approximately 0.17 mm), enables efficient and rapid evacuation of the gases out from EDLC stack via capillaries 132.

The distal end of capillaries 132 (i.e., the end protruding into channel 134) are preferably initially treated with a chemical composition that provides improved adhesion, ensuring that the capillaries remain adhered to the EDLC stack 150 after the final sealant 139 is applied. Capillaries 132 may also be chemically treated in a certain way in order to prevent the escape of gas from around the capillary 132.

Unidirectional valve 148 ensures that external oxygen does not enter EDLC stack 150 and reach electrodes 124 by passing back through channel 134 and capillaries 132 (i.e., in the reverse direction as the evacuated gases), as the incoming oxygen could result in current leakages. Furthermore, channel 134 may include a relatively long and narrow tube (e.g., a tube having a minimal length substantially equal to the width of stack 150 and having a minimal thickness substantially equal to the diameter of the capillaries 132), which prevents or minimizes diffusion of the excess gases and electrolyte, and which further serves to limit the passage of oxygen back into EDLC stack 150. In general, the disclosed technique employs at least one mechanism for preventing the passage of oxygen into EDLC stack 150, including but not limited to, the use of a unidirectional valve, and the use of a tube having a length and thickness that limits the passage of oxygen into said EDLC.

Referring now to FIG. 2B, film 211 includes a current collector 222, an electrode 224A, a frame 226, and at least one capillary 232. Electrode 224A has a freeform and asymmetrical shape, in contrast to the substantially square-shaped and symmetrical electrode 124A of FIG. 2A. It is appreciated that the freeform shape of electrode 224A provides for a larger electrode surface area, as compared to electrode 124A, for a given sized current collector film 211, and thus provides a larger maximum energy density for the capacitor (which is proportional to the electrode surface area). The inner edge of frame 226 is also asymmetrically-shaped to conform to the shape of electrode 224A. Capillary 232 passes directly through frame 226, rather than being disposed within a compartment situated in the frame (as with capillary 132 and compartment 131 of FIG. 2A). Capillary 232 extends along a portion of electrode 224A and protrudes out of frame 226 and into channel 234. The capillaries 232 protruding from each cell 211 in the stack 150 are assembled within the interior of channel 234, which passes through to the exterior of the stack 150, as with channel 134 (FIG. 3). Capillary 232 is operative for evacuating gases discharged by electrodes 124 (resulting from parasitic effects) out of the EDLC stack 150 via the capillary walls, analogous to capillary 132 (FIG. 2A). Capillary 232 is composed of a porous hydrophobic material (e.g., Teflon), such that gases are capable of passing through the capillary walls but liquids cannot. It is noted that capillary 232 is optionally formed in a U-shape, which helps prevent the aqueous electrolyte 125 from exiting the electrode 224A via the interior of capillary 232 (since the hydrophobic material of capillary only prevents liquid from passing through the capillary walls), thereby minimizing electrolytic dehydration. Accordingly, capillary 232 may also be tied or closed off at its end, for preventing release of aqueous electrolyte 125 via the capillary interior.

Figure 4:
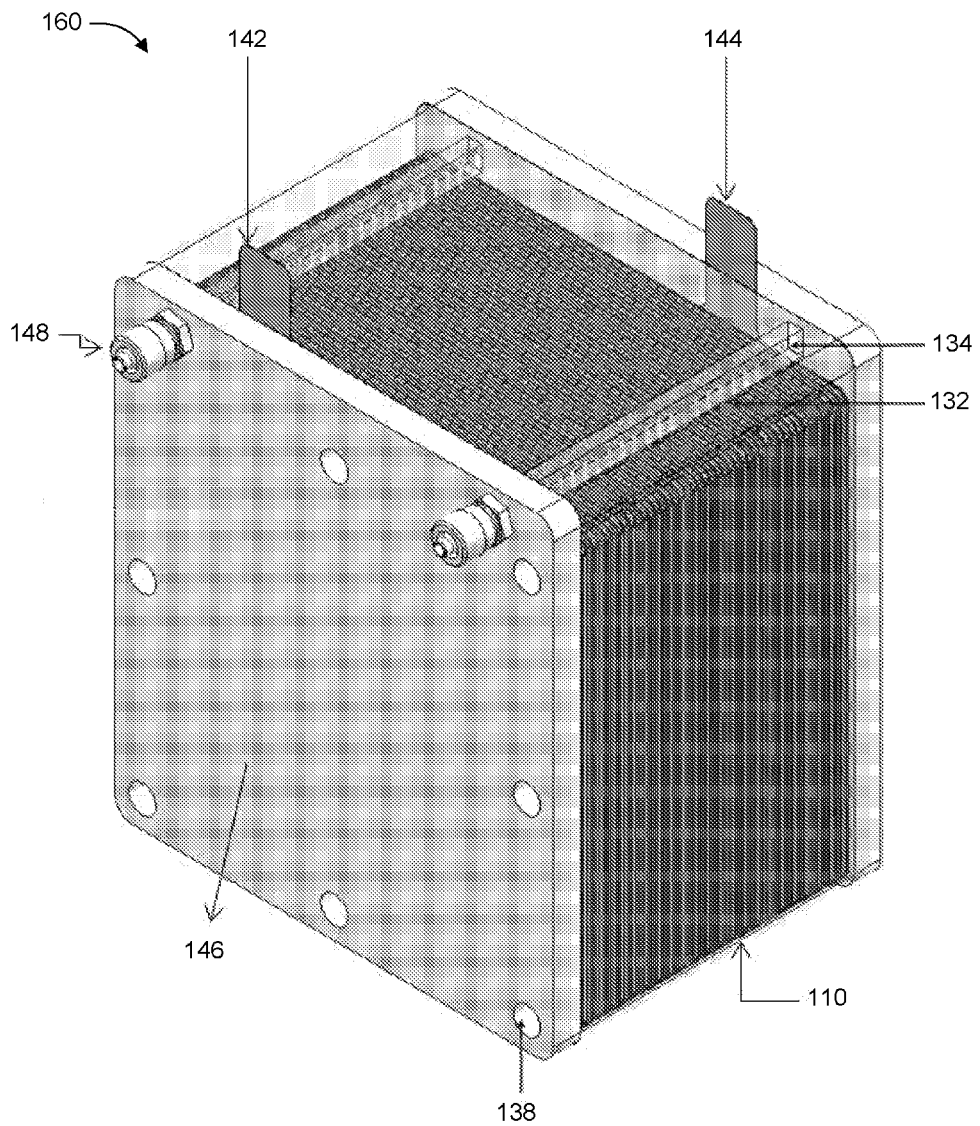
FIG. 4 is an isometric view schematic illustration of an EDLC stack which is fastened using screws, constructed and operative in accordance with an embodiment of the disclosed technique.
Figure 5:
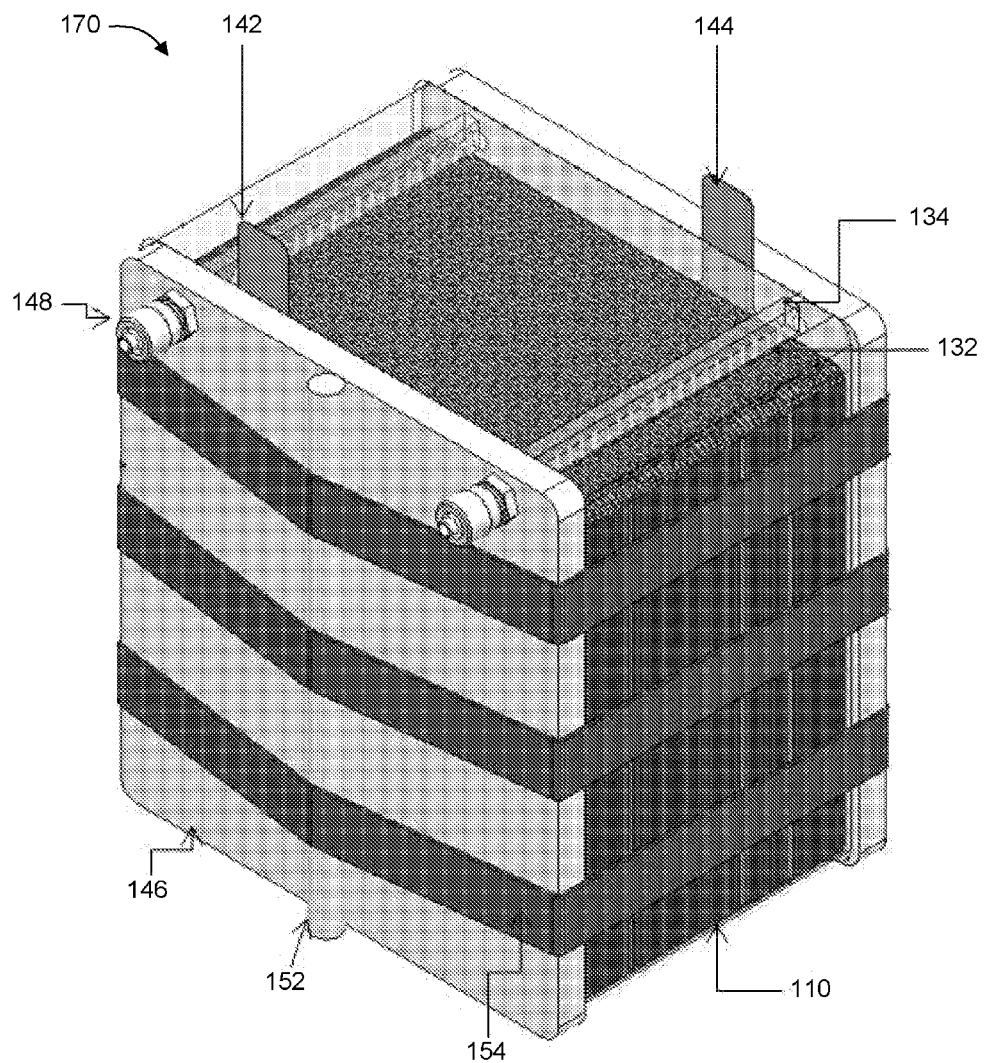
FIG. 5 is an isometric view schematic illustration of an EDLC stack which is fastened using rods and straps, constructed and operative in accordance with an embodiment of the disclosed technique.

Reference is now made to FIGS. 4 and 5. FIG. 4 is an isometric view schematic illustration of an EDLC stack, generally referenced 160, which is fastened using screws, constructed and operative in accordance with an embodiment of the disclosed technique. FIG. 5 is an isometric view schematic illustration of an EDLC stack, generally referenced 170, which is fastened using rods and straps, constructed and operative in accordance with an embodiment of the disclosed technique. The fastening mechanism ensures that pressure is maintained between plates 146. This pressure also helps to overcome minor discrepancies in parallelism, thickness and other parameters of the EDLC stack, reducing internal resistance of the EDLC. Referring to FIG. 4, the outer metal plates 146 of stack 160 are fastened together via a plurality of hold-down screws 138, such as clamping screws, disposed through both plates 146 at the perimeter of the plates 146 and cells 110. Referring to FIG. 5, outer metal plates 146 of stack 170 are fastened together via a plurality of straps 154 enclosed around both plates 146 and all the cells 110. It is appreciated that the use of straps 154 is preferable to screws 138, as it reduces the overall weight of the EDLC and requires less space. Additionally, the use of hold-down screws 138 tends to cause a curvature of plates 146 due to the force differential between the center and edges of plates resulting from the pressure exerted by screws 138 along the perimeter of plates 146. Therefore, the use of straps 154 has the added benefit of avoiding such curvature. Alternatively, plates 146 may be provided initially concave or with a predefined level of curvature in order to compensate for this effect, such that the plates 146 eventually straighten out after the application of screws 138 and suitable parallelism is maintained. Rods 152 are placed against the outer surface of plates 146 and are bounded by straps 154. Rods 152 serve to straighten out curvature in plates 148, and to disperse the applied pressure evenly along the entire surface of electrodes 124, thereby minimizing internal resistance. At least one graphite layer (not shown) is disposed between the final film in the EDLC stack and the adjacent metallic plate 146, preferably on both sides of the stack, in order to prevent electrolytic leakage while maintaining electrical conductivity.

It is appreciated than an exemplary EDLC of the disclosed technique generally operates over a prolonged lifespan at substantially high temperature levels and substantially high nominal/working voltages, in comparison to conventional organic-based capacitors. For example, an EDLC of the disclosed technique is capable of operation at a temperature range between approximately −40° C. and 75° C. It is further noted that an EDLC of the disclosed technique does not require external balancing (i.e., to maintain balanced voltage across the series-connected EDLC cells), and can be considered as being "self-balanced" In particular, the EDLC of the disclosed technique has a substantially robust structure and is substantially insensitive to voltage surges. Furthermore, the variation in capacitance (i.e., tolerance) between different cells is very small (e.g., a few percentages, as compared to capacitance variations of up to 30% in commercial organic capacitors). This is due to a number of factors. Firstly, the use of relatively thick electrodes (e.g., a thickness of approximately 700 µm). Secondly, the nominal working voltage of an individual cell in the stack is approximately 0.9V (rather than 1V, which corresponds to the electrolysis limit). Thirdly, the EDLC of the disclosed technique involves a "closed-loop" electrochemical system, since even if electrolysis occurs, the capillaries will evacuate the water vapor and other gases and prevent the capacitor from swelling or bursting, but the electrodes will dehydrate. The electrode dehydration causes an increase of the internal resistance, and thus an increase in the voltage, of the electrodes, resulting in a lower overall voltage limit for electrolysis (thereby preventing electrolysis from occurring).

In accordance with the disclosed technique, a method for manufacturing an EDLC includes preparing at least once capacitor cell by preparing two electrodes of opposite polarity, the electrodes including activated carbon impregnated with an aqueous electrolyte, disposing each of the electrodes onto a respective one of two current collectors aligned in parallel, the current collectors including a conductive material, disposing a separator between the electrodes, the separator including an inert, electrically-insulating and ion-permeable material, and disposing a rigid dielectric frame along the perimeter on the surface of at least one of the current collectors, the frame enclosing the electrodes.

It will be appreciated by persons skilled in the art that the disclosed technique is not limited to what has been particularly shown and described hereinabove.

The invention claimed is:

1. An electric double-layer capacitor (EDLC) comprising at least one capacitor cell, said capacitor cell comprising:
    two current collectors, aligned with their faces in parallel, said current collectors comprising a conductive material;
    two electrodes of opposite polarity, each of said electrodes disposed on a respective one of said current collectors, said electrodes impregnated with an aqueous electrolyte;
    a separator, disposed between said electrodes, said separator comprising an inert, electrically-insulating and ion-permeable material;
    a rigid dielectric frame, disposed along the perimeter on the surface of at least one of said current collectors and enclosing said electrodes; and
    at least one capillary respective of each electrode of said capacitor cell, said capillary formed within said frame and extending into a portion of said electrode, wherein said capillary comprises a porous hydrophobic material and is operative to evacuate discharged gases from said electrodes out of said EDLC.

2. The EDLC of claim 1, further comprising at least one compartment disposed in said frame, said compartment operative to collect residual electrolyte that seeps out from said electrodes.

3. The EDLC of claim 2, further comprising at least one notch formed at the inner perimeter of said frame and extending up to at least one said compartment.

4. An EDLC stack, comprising a plurality of capacitor cells as in claim 1 connected in series.

5. The EDLC of claim 4, wherein said stack is coated with a polymeric sealant to seal in said capacitor cells.

6. The EDLC of claim 4, comprising two metal plates, between which said capacitor cells are fixed and pressed together.

7. The EDLC of claim 6, further comprising at least one fastening mechanism, for holding together said plates.

8. The EDLC of claim 6, further comprising at least one graphite film, disposed between one of said plates and the adjacent capacitor cell, said graphite film operative to prevent electrolytic leakage while maintaining electrical conductivity.

9. The EDLC of claim 1, wherein said frame is made from a material selected from the list consisting of:
    polyvinyl chloride (PVC);
    polypropylene (PP);
    polytetrafluoroethylene (PTFE);
    EPDM rubber; and
    a dielectric polymer.

10. The EDLC of claim 1, wherein said at least one capillary comprises a plurality of capillaries, the distal ends of said capillaries coupled with a channel that extends out of said EDLC.

11. The EDLC of claim 10, wherein said channel comprises at least one mechanism operative to prevent the passage of oxygen into said EDLC.

12. The EDLC of claim 11, wherein said mechanism comprises a unidirectional valve disposed in said channel, said valve operative to enable said discharged gases to exit said EDLC while preventing gas entry into said EDLC.

13. The EDLC of claim 11, wherein said mechanism comprises a tube having a length and thickness that limits the passage of oxygen into said EDLC.

14. A method for manufacturing an electric double-layer capacitor (EDLC) comprising at least one capacitor cell, the method comprising the procedure of:
    preparing two electrodes of opposite polarity, said electrodes impregnated with an aqueous electrolyte;
    disposing each of said electrodes onto a respective one of two current collectors aligned in parallel, said current collectors comprising a conductive material;
    disposing a separator between said electrodes, said separator comprising an inert, electrically-insulating and ion-permeable membrane;
    disposing a rigid dielectric frame along the perimeter on the surface of at least one of said current collectors, said frame enclosing said electrodes; and
    forming at least one capillary, respective of each electrode of said capacitor cell, within said frame and extending into a portion of said electrode, wherein said capillary comprises a porous hydrophobic material and is operative to evacuate discharged gases from said electrodes out of said EDLC.

15. The method of claim 14, further comprising the procedure of forming at least one compartment within said frame, said compartment operative to collect residual electrolyte that seeps out from said electrodes.

16. The method of claim 15, further comprising the procedure of forming at least one notch at the inner perimeter of said frame and extending up to at least one said compartment.

17. The method of claim 14, wherein said procedure of preparing two electrodes comprises the procedures of:
    thermally treating an electrode mixture comprising activated carbon;
    impregnating said electrode mixture with an electrolyte solution while subjecting said mixture to a colloidal mill;
    terminating said colloidal mill, producing an electrode/electrolyte paste; and
    rolling said paste into a sheet with a selected thickness, and cutting the sheet into multiple electrode sections with selected dimensions.

18. The method of claim 14, further comprising the procedure of connecting a plurality of said capacitor cells in series, to prepare an EDLC stack.

19. The method of claim 18, further comprising the procedure of providing at least one mechanism in said channel operative to prevent the passage of oxygen into said EDLC.

20. The method of claim 14, further comprising the procedure of casting at least one channel that extends out of said EDLC, wherein the distal ends of a plurality of capillaries of said at least one capillary are coupled with at least one said channel.

* * * * *